Patented May 8, 1951

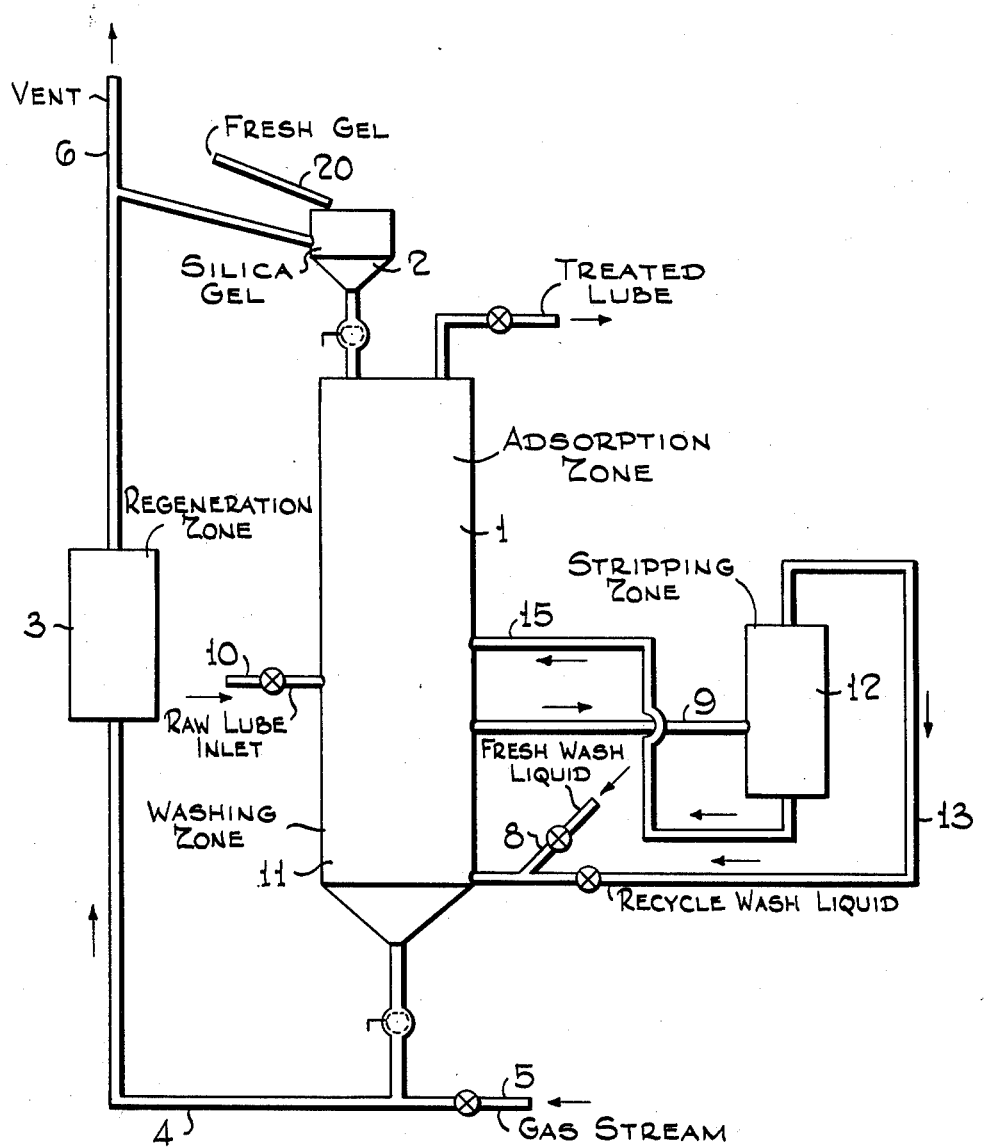

2,552,435

UNITED STATES PATENT OFFICE 2,552,435

LUBRICATING OIL TREATING PROCESS

William T. Knox, Jr., Cranford, and Robert L. Weeks, Union, N. J., assignors to Standard Oil Development Company, a corporation of Delaware Application December 6, 1947, Serial No. 790,062

4 Claims. (Cl. 196—147)

This invention relates to a process and apparatus for treating fluids with solid adsorbents. The invention particularly relates to the treatment of lubricating oil with synthetic gel adsorbents to improve the viscosity index of the lubricating oil. The apparatus of the present invention is suitable for continuously treating lubricating oil with solid adsorbents. In accordance with the present invention a flow of adsorbent gel is maintained through an adsorption zone through which the oil and a suitable diluent and wash liquid is also flowed countercurrently.

It is known to the art that the viscosity index of lubricating oils may be improved by treatment with a suitable solid adsorbent. For this purpose a wide variety of adsorbent materials may be used; for example, adsorbent charcoal, adsorbent clay, fuller's earth, bentonite, silica gel, alumina gel or adsorbent magnesium silicate. However, it is generally recognized that the adsorbent properties of silica gel qualify it as one of the most efficient adsorbents. The present invention is therefore described particularly as it relates to silica gel adsorption.

Various procedures have been developed to contact an oil, such as lubricating oil with an adsorbent gel. However, the adsorption processes used have proved to be impractical for large scale operation due to certain inherent disadvantages, so that consequently these processes have not been extensively applied on a commercial scale. In general, the disadvantages of these processes result from the fact that relatively large quantities of adsorbent are required per volume of treated material. As a result processes known to the art generally entail cumbersome and inefficient apparatus. One of the conventional processes for example, comprises forming a deep bed of gel in a suitable tower and percolating the material to be treated through the bed. This procedure entails all the disadvantages of a batch process as opposed to a continuous process. Operation must be intermittent and means must be provided for regenerating the bed of gel. Regeneration may be accomplished by removing the gel to a desorbing zone or alternatively by contacting the gel in situ with desorbing liquid. Generally apparatus requirements are doubled to provide both on-stream and off-stream adsorbent towers to permit continued operation during the periods of regeneration. A further disadvantage of this type of treatment is that the effectiveness of the adsorption treatment varies considerably. The material, of course, being treated in a freshly regenerated bed of gel will be much more effectively treated than material passing through a nearly exhausted bed of the adsorbent. This is a severe disadvantage, particularly in the treatment of lubricating oils, in that highly efficient adsorbent treatment is required requiring highly selective gel treatment.

It is the purpose of the present invention to overcome these disadvantages by provision of a continuous flow process for contacting an adsorbent gel with lube oils to be treated.

According to the present invention the solid gel is introduced into the top of a treating zone and allowed to pass downwardly through the zone under the action of gravity countercurrent to a flow of lubricating oil flowing upwardly through the zone. Fresh or regenerated gel is continuously added at the top of the tower and spent gel is continuously removed from the bottom of the tower. The lubricating oil to be treated is introduced at about the middle of the treating zone and, as stated, flows upwardly through the zone. A suitable wash liquid is introduced at the bottom of the zone and a part of this wash liquid is withdrawn below the point of introduction of the lubricating oil. The wash liquid serves as a diluent of the lubricating oil to increase the fluidity of the system and also serves as a desorbing agent to effect a reflux action in order to increase the selectivity of the gel treatment.

It is an object of the present invention to carry out the adsorption process in a relatively small treating space so that the treatment of the lubricating oil by large volumes of silica gel is thereby greatly facilitated.

It is an object of the present invention to eliminate the necessity for having a double adsorption zone ordinarily required in batch procedures.

It is an object of this invention to increase the selectivity of the adsorption treatment by establishing a zone employing a low molecular weight paraffinic compound as a desorbing agent which introduces a refluxing action into the adsorption treating system.

A still further object is to provide means for obtaining uniform treating results by proper adjustment of the silica gel and feed material flow rates.

Further objects and advantages of this invention will become apparent from the following detailed description in connection with the accompanying drawing which represents diagrammatically the process and apparatus for continuously treating lubricating oil with silica gel.

Referring now to the drawing, the silica gel is introduced at the top of vertical tower 1 and is passed downwardly through the tower against a liquid flow which is upward in the tower. The silica gel may be introduced from the feed hopper 2 by means of a basket valve, star feeder, or equivalent means used for introducing solids into a liquid system. Feed hopper 2 receives either fresh gel from line 20 or regenerated gel from reactivator zone 3. A basket valve or equivalent means is used at the bottom of the tower to control silica gel removal through tarnsfer line 4. An auxiliary gas stream 5 may be used with or without mechanical conveying means, not shown, to aid in moving the gel from the base of the tower to the reactivation zone 3. Excess gas pressure from the reactivation process or from the auxiliary gas stream 5 is vented through vent line 6. Feed material comprising the raw lube oil to be treated is introduced into about the middle of tower 1 through line 10. A suitable wash liquid is introduced at the bottom of the tower through line 8. A portion of this wash liquid is withdrawn from the tower through line 9 positioned part way up tower 1 below the level at which the raw lube oil is introduced. The wash liquid which is withdrawn through line 9 is introduced into a stripping zone 12 in which the majority of the recovered wash liquid is removed overhead by means of line 13 and recirculated back to the washing zone 11. The bottoms of stripping zone 12, comprising the balance of the solvent and lube paraffins, is withdrawn by means of line 15 and is reintroduced into the adsorbing zone at a point above the introduction of the raw lube oil. A line 16 is provided at the top of the adsorption zone to remove the treated lube oil.

In this apparatus the liquid flow in the system is upward, countercurrent to the flow of silica gel passing downwardly through the tower. The fresh or regenerated gel introduced at the top of the tower will adsorb constituents of the lube oil as it flows downwardly. A beneficial refluxing action will occur in the middle part of the tower above the washing zone 11. In the washing zone 11 adsorbed constituents of the lube oil will be partially displaced by the washing liquid introduced through line 8. These freed constituents will form a layer in the column principally about the outlet 9 and below the feed inlet 10. This layer of desorbed material will effect the adsorption equilibrium of silica gel passing downwardly through the layer with the result that a fractionation of the adsorbed constituents will occur. The fractionation effect will cause less readily adsorbed constituents to be replaced by constituents having a higher affinity for the silica gel. This fractionation is aided by the return to the tower of the paraffinic bottoms from the stripping zone. By suitably adjusting the flow of the wash liquid, it is possible to withdraw the desorbed undesirable constituents through line 9 while permitting valuable constituents to be returned up through the top of the tower. The height and diameter of the tower will be determined by design requirements based upon the quantity of feed material to be treated, the required volume of silica gel per volume of feed material, and the relative rates of flow of feed material and silica gel passing through the adsorption zone. In general it may be noted, however, that the higher the tower the greater the selectivity of the adsorption obtained. This is due to the fact that adsorption is essentially an equilibrium phenomenon. Consequently, the greater the path of the feed material through the gel, the greater the opportunity to separate selectively the constituents having different affinities for the silica gel. Toward this same end, it is desirable to employ designed practices normally used with hindered settlers, such as baffles and agitation, to lengthen the path of silica gel through the treating zone.

The size and shape of the gel particles used is not a part of this invention and the present apparatus may be used with a coarse or finely ground gel, gel microspheres or any other convenient form of material. Gel microspheres may be preferred to avoid attrition losses. In general, it is desirable to use gel which has been graded in a suitable range of sizes so that the settling rate is substantially uniform for different size particles.

The volume of gel required per volume of feed material is a function of the viscosity index improvement desired and varies as well with the nature of the raw lube treated. In general, the amount of gel used per volume of feed is approximately 220 to 770 wt. percent. Effective treatment is secured, however, from between about 220 to 240 weight percent.

It is essential in the operation of the process as described that a suitable wash liquid be chosen. Suitable wash liquids comprise low molecular weight paraffinic hydrocarbons, such as normal heptane, normal hexane and normal pentane. The action of the wash liquid is to release lube paraffin components mechanically held by the silica gel. This function of the wash liquid is performed in the lower part of the tower, called the washing zone in the drawing. The wash liquid also serves the function of a viscosity breaking medium for the raw lube feed in the upper part of the tower. We have discovered that in a lube oil-solid adsorbent system of the type described, maximum selectivity of the silica gel is obtained when employing the minimum amount of solvent in the adsorption zone and the maximum amount of solvent in the washing zone. This is indicated by the following table employing n-hetane as the solvent and treating dewaxed Panhandle lube distillate having an initial viscosity index of 78.

| Treating conditions: | | | | |
|---|---|---|---|---|
| Silica gel treat—Wt. per cent | 440 | | 660 | |
| Total solvent—vol. per cent | 1000 | | 1200 | |
| Adsorption step—vol. per cent | 700 | 1000 | 800 | 1200 |
| Washing step—vol. per cent | 300 | 0 | 400 | 0 |
| Treated oil—V. I. | 108 | 104 | 111 | 108 |

The above data show that for a 440 weight percent treat when using 1000 volume percent total solvent, the solvent is most selectively employed by using 700 volume percent in the adsorption zone and 300 volume percent in the washing zone. The data at 660 weight percent gel treat and 1200 volume percent solvent treat show a similar advantage for applying the highest possible proportion of total solvent as wash. The use of the higher proportions of solvent as wash also results in higher yields of lube oil having improved quality. We have also discovered that operation of the adsorption zone with the minimum amount of solvent dilution consistent with the necessary viscosity reduction of the lube oil results in the most selective removal of aromatic components. In general, a solvent dilution between 0 and 100 volume percent is optimum. It is generally preferred to use a dilution of about 50 to 100%.

Operating in accordance with these principles, a high volume percent of solvent is introduced as wash liquid in the lower portion of the tower. A large portion of the wash liquid is then removed from the tower through line 9 and stripped of solvent in stripping zone 12. The stripped lube, as described, is returned to the tower in the adsorption zone. The lube returned to the tower from the stripper will have a viscosity index lower than that of the finished oil leaving the top of the tower but superior in viscosity index to the raw lube feed.

As described, our invention comprises a countercurrent continuous silica gel lube oil treating zone. A solvent wash liquid of paraffinic nature is introduced to the bottom of the zone serving to wash paraffinic constituents of the lube oil from the silica gel and to break the viscosity of the lube oil. A high volume percent of wash liquid is employed in the bottom part of the tower to attain the desired washing action. The majority of the solvent is then removed from the tower below the adsorption zone leaving only sufficient solvent in the adsorption zone to properly adjust the viscosity of the lube oil for optimum treatment by the silica gel. By means of this treatment, the viscosity index of a lube oil may be materially improved. In general it is practicable to increase the viscosity index of typical lube oils from about 50 to 80 to about 100 to 130.

The method of regenerating the silica gel employed in the apparatus of this invention is not a part of the present invention. Any suitable means of regeneration known to the art may be employed. For example, the regeneration zone may comprise a washing zone wherein the silica gel is washed with a polar desorbent such as hot water or alcohol or a paraffinic solvent such as normal heptane. It is generally preferred to dry the silica gel after it has been suitably washed and before returning it to the adsorption zone.

Having now fully described this invention, what is claimed is:

1. In a continuous counterflow process for contacting lubricating oils with silica gel in a vertical treating zone into which the silica gel is introduced at the top of the zone, is passed downwardly through the zone and is withdrawn from the bottom of the zone, the oil together with other liquid constituents to be contacted being introduced substantially at the middle of the treating zone and being removed from the top of the treating zone, the improvement which comprises introducing a low molecular weight paraffin hydrocarbon at the bottom of the zone, and at least partially withdrawing said low molecular weight paraffinic hydrocarbon at a point partway of the zone below the point of introduction of the oil together with the other liquid constituents present in the treating zone, said withdrawn paraffinic hydrocarbon and liquid constituents being passed to a distillation zone, returning to the bottom of the said treating zone the overhead of the distillation zone and returning the bottoms product of the distillation zone to the treating zone at a point above the introduction of the oil to be treated.

2. The process defined by claim 1 in which the low molecular weight paraffin hydrocarbon comprises normal heptane.

3. The process defined by claim 1 in which the low molecular weight paraffin hydrocarbon comprises normal pentane.

4. The process defined by claim 1 in which the low molecular weight paraffin hydrocarbon comprises normal hexane.

WILLIAM T. KNOX, Jr.
ROBERT L. WEEKS.

REFERENCES CITED

The following references are of record in the file of this patent:

UNITED STATES PATENTS

| Number | Name | Date |
|---|---|---|
| 2,384,311 | Kearby | Sept. 4, 1945 |
| 2,395,491 | Mavity | Feb. 26, 1946 |
| 2,398,101 | Lipkin | Apr. 9, 1946 |
| 2,415,315 | Walter et al. | Feb. 4, 1947 |
| 2,441,572 | Hirschler et al. | May 18, 1948 |
| 2,470,339 | Claussen et al. | May 17, 1949 |